(12) United States Patent
Alexandrov

(10) Patent No.: US 8,760,506 B2
(45) Date of Patent: Jun. 24, 2014

(54) IMAGING SYSTEM AND METHOD FOR ENHANCING MICROSCOPIC IMAGES OF UNSTAINED CELLS

(75) Inventor: Yuriy Alexandrov, Cardiff (GB)

(73) Assignee: GE Healthcare UK Limited, Little Chalfont (GB)

( * ) Notice: Subject to any disclaimer, the term of this patent is extended or adjusted under 35 U.S.C. 154(b) by 452 days.

(21) Appl. No.: 13/056,824

(22) PCT Filed: Jul. 30, 2009

(86) PCT No.: PCT/EP2009/059881
§ 371 (c)(1),
(2), (4) Date: Jan. 31, 2011

(87) PCT Pub. No.: WO2010/015563
PCT Pub. Date: Feb. 11, 2010

(65) Prior Publication Data
US 2011/0134233 A1    Jun. 9, 2011

(30) Foreign Application Priority Data

Aug. 5, 2008 (GB) .................................. 0814297.8

(51) Int. Cl.
| | |
|---|---|
| *G02B 21/00* | (2006.01) |
| *G06K 9/40* | (2006.01) |
| *H04N 9/47* | (2006.01) |
| *H04N 7/18* | (2006.01) |

(52) U.S. Cl.
USPC .............. 348/79; 359/368; 359/383; 382/254

(58) Field of Classification Search
USPC ................................ 348/79; 382/133; 359/368
See application file for complete search history.

(56) References Cited

U.S. PATENT DOCUMENTS

| 4,577,964 A | 3/1986 | Hansen, Jr. |
| 4,601,551 A | 7/1986 | Pettingell et al. |
| 4,915,501 A | 4/1990 | Steen |
| 5,047,854 A * | 9/1991 | Iwabuchi et al. ........ 375/240.24 |
| 5,124,842 A | 6/1992 | Honda et al. |

(Continued)

FOREIGN PATENT DOCUMENTS

| EP | 1 316 793 | 6/2003 |
| EP | 1 847 955 | 10/2007 |

OTHER PUBLICATIONS

Sernetz, M., et al., Immersion Refractometry on Living Cells with the Method of Refractive Index Gradient, Fresenius' Zeitschrift für Analytische Chemie, 252(2-3), pp. 90-93, 1970.

(Continued)

*Primary Examiner* — Joseph Ustaris
*Assistant Examiner* — Rebecca Volentine

(57) ABSTRACT

According to one aspect, the present invention relates to an imaging system 100 for enhancing microscopic images of unstained cells. The imaging system 100 comprises a light source 102 for producing light 120a, a sample holder 109 for containing cells to be imaged, a condenser 104 for focussing the light 120b at a focal plane within the sample holder 109 on the cells to be imaged, a translation mechanism for moving the focal plane of the light 120b relative to the sample holder 109 and a detector system 112 configured to acquire a plurality of images at respective focal planes within the sample holder 109 and process the plurality of images to provide an enhanced processed imaged.

20 Claims, 6 Drawing Sheets

(56) References Cited

U.S. PATENT DOCUMENTS

| | | | |
|---|---|---|---|
| 6,438,261 | B1 | 8/2002 | Moshe et al. |
| 7,236,643 | B2 * | 6/2007 | Albertelli et al. ............. 382/270 |
| 7,271,952 | B2 * | 9/2007 | Suzuki et al. ................ 359/368 |
| 7,729,049 | B2 * | 6/2010 | Xu et al. ...................... 359/383 |
| 7,826,675 | B2 * | 11/2010 | Kisilev ......................... 382/257 |
| 2005/0013478 | A1 | 1/2005 | Oba et al. |
| 2006/0166305 | A1 | 7/2006 | Jiang et al. |
| 2008/0099661 | A1 * | 5/2008 | Virag et al. ................ 250/201.3 |
| 2008/0219542 | A1 * | 9/2008 | Temov et al. ................ 382/133 |

OTHER PUBLICATIONS

Jamjoom, G. A., Dark-field Microscopy for Detection of Malaria in Unstained Blood Films, Journal of Clinical Microbiology, 17(5), pp. 717-721, 1983.

Steen, H. B., Simultaneous Separate Detection of Low Angle and Large Angle Light Scattering in an Arc Lamp-based Flow Cytometer, Cytometry: The Journal of the Society for Analytical Cytology, 7(5), pp. 445-449, 1986.

Ott, D., Optical Scatter Imaging Tracks Cell Changes, Biophotonics International, 9(9), pp. 23-24, 2002.

Degerman, J., et al., A Computational 3D Model for Reconstruction of Neural Stem Cells in Bright-Field Time-Lapse Microscopy, Proceedings of SPIE the International Society for Optical Engineering, IS&T Electronic Imaging, vol. 6498, pp. 469-483, 2007.

Davidson, M. W., et al, Darkfield Illumination, FSU primer, Last Modification Aug. 1, 2003, retrieved from internet Jan. 19, 2011, http://microscopy.fsu.edu/primer/techniques/darkfield.html.

JP09097332, Shimadzu Corp, WPI Abstract Accession No. 1997-269128.

DE19517300, Askania Werke Rathenow GMBH, WPI Abstract Accession No. 1996-506853.

* cited by examiner

IMAGING SYSTEM AND METHOD FOR ENHANCING MICROSCOPIC IMAGES OF UNSTAINED CELLS

CROSS-REFERENCE TO RELATED APPLICATIONS

This application is a filing under 35 U.S.C. §371 and claims priority to international patent application number PCT/EP2009/059881 filed Jul. 30, 2009, published on Feb. 11, 2010 as WO 2010/015563, which claims priority to application number 0814297.8 filed in Great Britain on Aug. 5, 2008.

FIELD OF THE INVENTION

The present invention relates generally to microscopy. In particular, the present invention relates to image processing of microscopy images to improve image contrast.

BACKGROUND OF THE INVENTION

Microscopy as a technique for the imaging of biological cells has been in use for many hundreds of years, over which period many techniques have been developed to improve the quality of images that are obtained of such biological cells when using various microscopes.

Historically, microscopy techniques have seen an evolution from complex intricate optics-based solutions for image enhancement [1-6] towards more recent developments that apply various image processing techniques [7-9] to images obtained in order to enhance images.

However, whilst a combination of modern optics and image processing techniques has provided for improved microscopy images, there are still certain applications where conventional techniques are sub-optimal for this task.

For example, in various applications the visualisation of non-stained cells with transmitted light is considered a desirable mode of imaging. However, where the cells lack contrast with a surrounding medium, they can be difficult to image. Additionally, the use of certain conventional techniques that may be used to address this problem, such as the use of fluorescent markers [6,8], are not well-suited for various applications like high-throughput screening (HTS) microscopy assays as they require the use of chemical contrast agents that might themselves harm living cells or otherwise influence the biochemical processes that occur in those cells.

SUMMARY OF THE INVENTION

Various aspects and embodiments of the present invention have been developed with the aforementioned drawbacks of conventional microscopy systems bourn in mind.

According to a first aspect of the present invention, there is provided an imaging system for enhancing microscopic images of unstained cells. The imaging system comprises a light source for producing light, a sample holder for containing cells to be imaged, a condenser for focussing the light at a focal plane within the sample holder on the cells to be imaged a translation mechanism for moving the focal plane of the light relative to the sample holder and a detector system configured to acquire a plurality of images at respective focal planes within the sample holder near to the best focus and process the plurality of images to provide an enhanced processed imaged.

According to a second aspect of the present invention, there is provided a method for enhancing microscopic images of unstained cells. The method comprises acquiring a plurality of images at respective focal planes within the sample holder and processing the plurality of images to provide an enhanced processed imaged.

Such an imaging system and method provides for automated image acquisition and enhancement for cellular imaging. Advantageously it also allows non-experts to use aspects of the present invention in high throughput screening assays with better accuracy in identifying cellular changes that are indicative of an effect of potential interest. For example, potentially useful drug compounds effecting various types of cell can be identified from automated imaging of those cells. Moreover, these cells may also be accurately imaged in-vivo ensuring that there is no requirement for them to be stained or tagged, e.g. using fluorescent markers or radio-isotopes, in order to obtain the enhanced processed images.

DETAILED DESCRIPTION OF THE INVENTION

Figure 1:
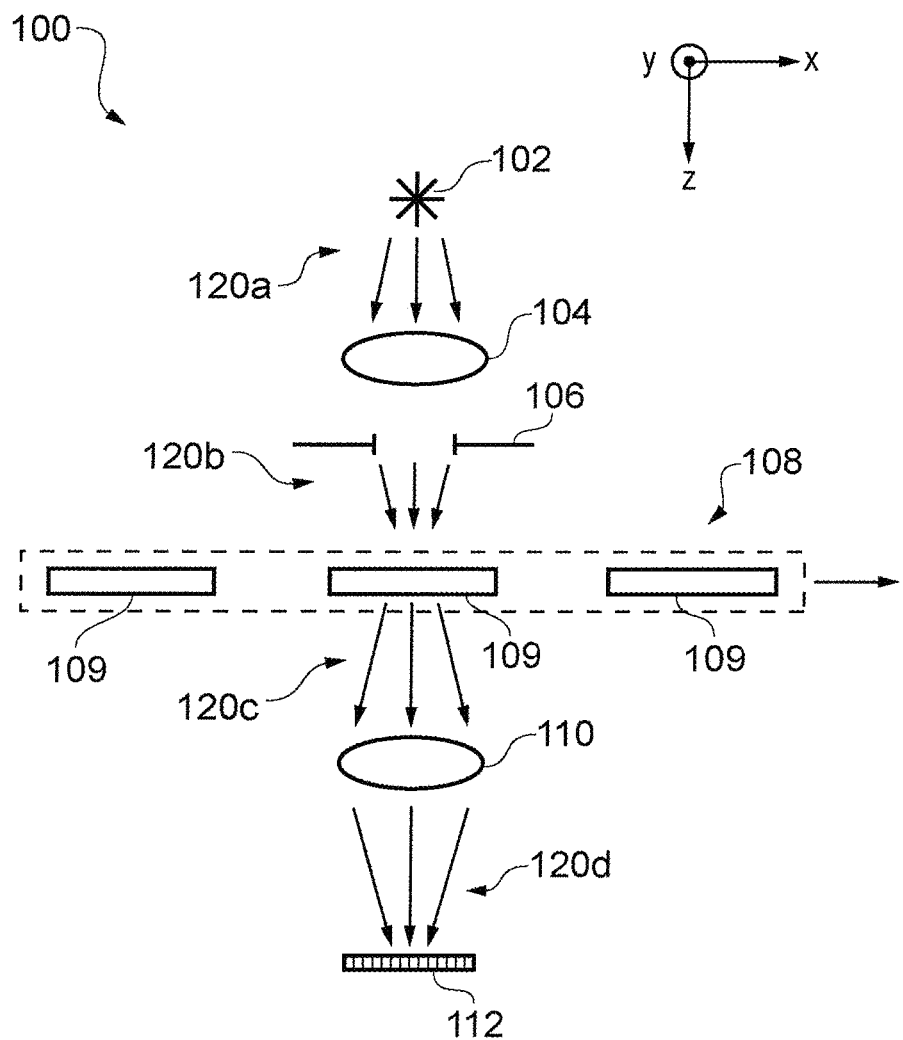
FIG. 1 shows an imaging system for enhancing microscopic images of unstained cells in accordance with an embodiment of the present invention.

FIG. 1 shows an imaging system 100 for enhancing microscopic images of unstained cells in accordance with an embodiment of the present invention. The imaging system 100, which is illustrated schematically for clarity, comprises a light source 102 for producing light 120a. The light source 102 provides bright-field Kohler illumination.

The light 120a is focussed by a condenser 104 onto a sample holder 109. The sample holder 109 can be used to contain cells to be imaged, and the condenser 104 can focus the light 120b at a focal plane within the sample holder 109. One or more sample holders 109 can be provided as a matrix in a sample holder tray 108. For example, sample holders may be provided as spots on a consumable spot plate having an array of such sample holders, each respective spot being provided with one or more cell-types suitable for identifying a particular biochemical reaction or set of reactions.

The imaging system 100 also contains a detector system 112 and a translation mechanism (not shown). The translation mechanism is configured to move the focus of the light 120b relative to the sample holder 109 (e.g. by moving the sample holder tray 108 depth-wise in the ±z-directions). This enables a plurality of images to be acquired at various respective focal planes (perpendicular to the z-direction) from within various sample holders 109. Additionally, the translation mechanism may be operable to move the sample holder tray 108 in various x-y planes shown in FIG. 1 in either one or two dimensions, for example, to bring various sample holders 109 into focus.

The detector system 112 may be used to identify a best focus within the sample holder 109. The detector system 112 is operable to acquire a plurality of images at respective focal planes (e.g. z-positions) within the sample holder 109 (e.g.

near to the best focus), and to process the plurality of images to provide an enhanced processed imaged. Various ways of implementing such functions are described in greater detail below by way of example.

An aperture stop 106 is provided between the light source 102 and the detector system 112, the size of which may be variable. For example, various differently sized movable apertures may be rotated into position or a continuously variable iris-type diaphragm may be provided. Image contrast can be controlled by changing the aperture setting of the aperture stop 106.

Focussed light 120*b* passing through the aperture stop 106 passes through the sample holder tray 108 in a transmission imaging mode. Emergent light 120*c* modulated with image information relating to any cells held with a respective sample holder 109 is collected by an objective lens 110 and focussed 120*d* onto the detector system 112.

In one variant, processing of the plurality of images is performed by a processor (not shown). The processor is operable to control the detector system 112 and to acquire, store and process images obtained by the detector system. Additionally, the processor can be configured to control the translation mechanism to move the focus of the light source 102 relative to the sample holder 109 (i.e. the depth-wise position in the z-direction) and optionally to identify the best focus (i.e. optimal z-position setting). The processor may, for example, be provided as part of a computer system appropriately programmed to perform such tasks.

The processor is operable to apply a pixel-by-pixel minimisation operation to each of the plurality of images to identify a so-called dark image, $U_1$. A non-linear top-hat (NTH) transform is then applied to the dark image $U_1$ to obtain an intermediate image $U_2$ and the intermediate image $U_2$ is processed to produce a resultant enhanced image $U_r$.

The basis for the NTH segmentation is the pixel-wise image transform:

$$NTH(U; \varepsilon \mid K) = \frac{U \cdot \langle U \rangle_\varepsilon}{(\langle U \rangle_{K\varepsilon})^2}, \text{ where } K > 1 \quad \text{Equation (1)}$$

The scale parameter $\varepsilon$ (the detection scale) relates to an object's size of interest. The transform described by Equation (1) implements the following heuristic formula of local enhancement: a pixel is enhanced if it is bright, its close vicinity ($\varepsilon$-sized) is bright, and its far vicinity ($K\varepsilon$-sized) is dim.

In various embodiments, the dark image is defined by:

$$U_1 = \min_k \{U(Z_k)\} \quad \text{Equation (2)}$$

where $U(Z_k)$ is the $k^{th}$ image in the z-plane;
the intermediate image is defined by:

$$U_2 = NTH(inv[U_1]; \varepsilon|.) \quad \text{Equation (3)}$$

where NTH is a non-linear $\varepsilon$-pixel sized (e.g. m=9) top-hat operation applied to the inverted dark image, and inv[ . . . ] is the image inversion operation. The resultant segmented image $U_r$ is obtained by applying the following transform:

$$U_r = U_T + \frac{(U_2 - U_T) + |U_2 - U_T|}{2} \quad \text{Equation (4)}$$

where $U_T$ defines a threshold image. For example, in certain embodiments $U_T$ may be set to $U_T=1$ for all pixel values.

In conventional microscopy, contrast is proportional to the amount of defocusing. However, the Applicant has applied the theory that certain cells act as lenses to show that the cell lensing effect can be used to enhance image contrast by removing bright feature information and using the dark feature information. When this criterion is met, various advantages are obtained as outlined below. In various embodiments according to the present invention, it is thus possible to use bright and/or dark feature information, possibly in combination, as is also described further below.

Various systems and methods employing the cell lensing effect can be used to optimise cell contrast ratio in a simple manner. Additionally, good contrast images can be obtained from relatively thick samples (for example, where the thickness of the sample is greater than about 2×, 5×, 10×, 20×, 50×, 100×, etc., of an average cell diameter of the cells to be imaged), and unmarked or untagged low optical contrast cells can be used. For example, suitable cells that can give rise to lensing effect may be substantially lenticular in shape, such as certain angiogenic cells, blood cells, sperm cells, keratocytes, stem cells, or various other cells having the shape of a sack with prevalent positive curvature.

Additionally, various cell nuclei as well as cell bodies can be imaged and/or numerous z-plane sections may be collated into a single image for easy automated, or semi-automated, analysis. Rapid and accurate identification of various cellular features of interest can thus be provided, thereby making various embodiments of the present invention particularly well-suited to applications involving HTS.

Figure 2:
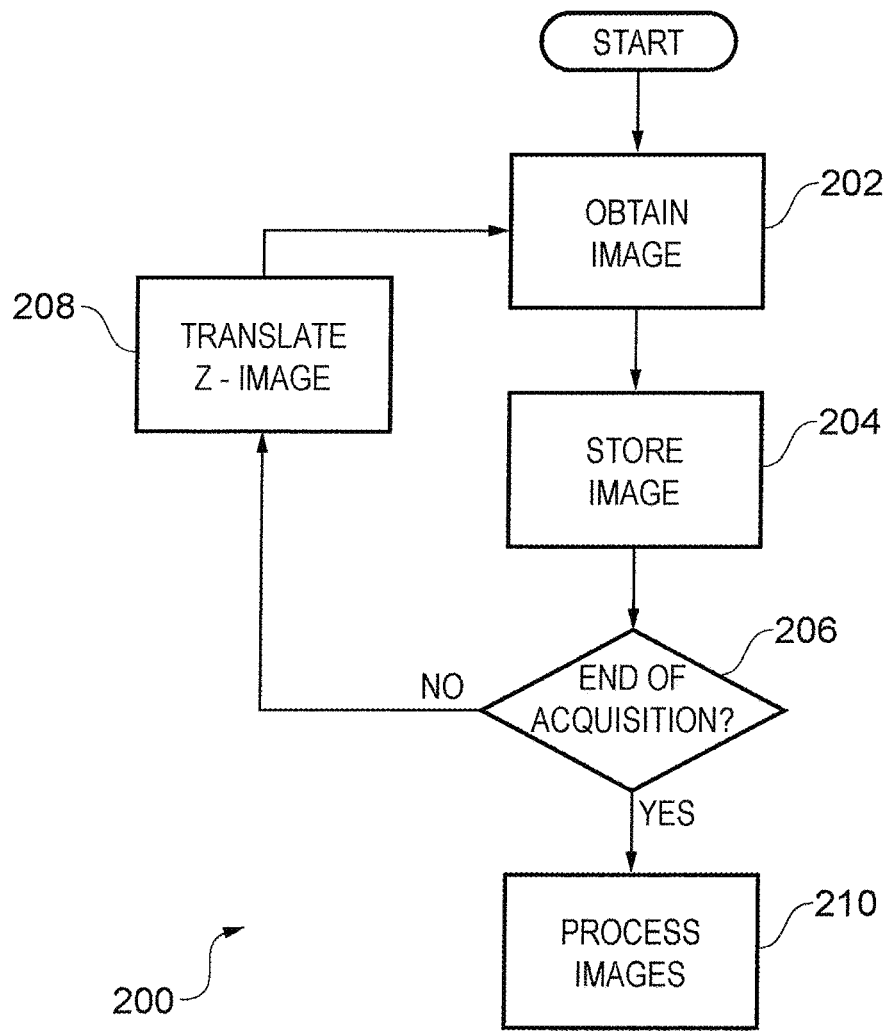
FIG. 2 shows a method for enhancing microscopic images of unstained cells in accordance with an embodiment of the present invention.

FIG. 2 shows a method 200 for enhancing microscopic images of unstained cells in accordance with various aspects and embodiments of the present invention. The method 200 comprises acquiring and processing a set of images to provide an enhanced processed image, and may be used for enhancing microscopy images of unstained cells by obtaining a plurality of images in the z-direction using axial defocusing.

At step 202 an image is obtained at a first focal plane. For example, this image can be obtained using an imaging system of the type described in connection with FIG. 1, above. Optionally, a further step of setting an aperture stop prior to obtaining the image can be performed, for example, in order to enhance the contrast of the image.

Once obtained, the image is stored at step 204. At step 206 a decision is then made to determine whether or not any further images are to be acquired.

If further images are to be obtained, a z-stage translation is made to modify the position of the focal plane within a sample at step 208. The method 200 then moves back to step 202 and a further image is obtained. The further image is then stored at step 204 and the decision step 206 repeats the z-stage translation, image acquisition and storage steps until a set numbering k images is obtained (where k is an integer 2). Once the plurality of k images has been obtained, the method 200 moves on to processing step 210.

Processing step 210 involves applying a pixel-by-pixel minimisation operation to each of the plurality of images to identify a dark image $U_1$, then applying a non-linear top-hat transform to the inverted dark image $U_1$ to obtain an intermediate image $U_2$, and finally processing the intermediate image $U_2$ to produce a resultant segmented image $U_r$. In various embodiments, the values of $U_1$, $U_2$, and $U_r$ are determined in accordance with respective of Equations 2 to 4, defined above.

Figure 3:
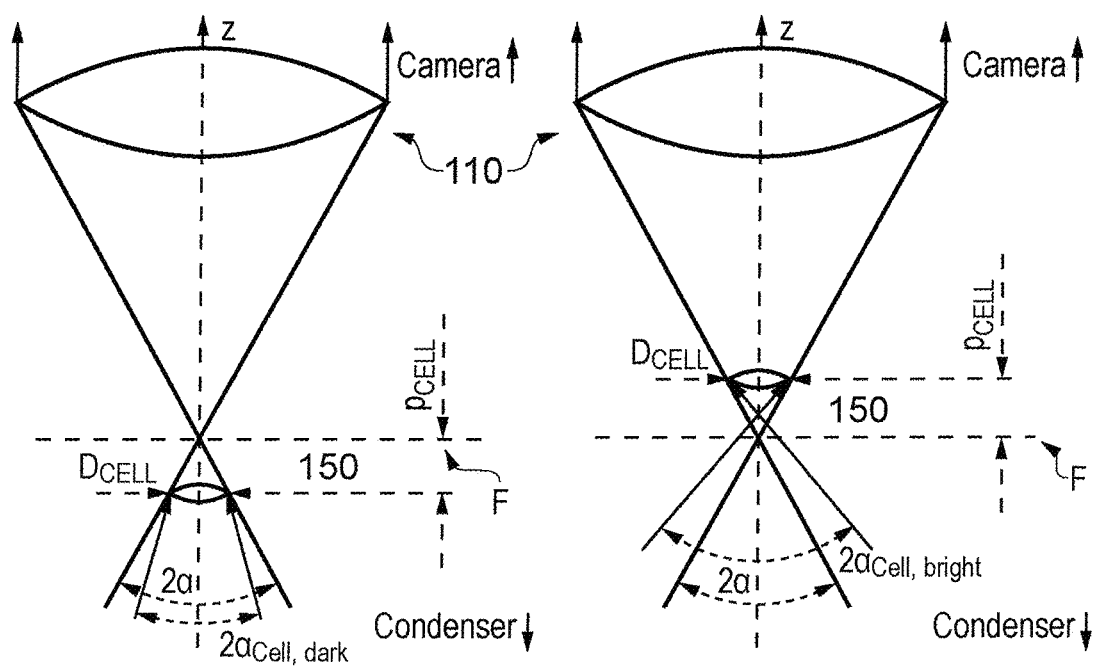
FIG. 3 shows part of an optical system for use with various embodiments of the present invention.
Figure 3:
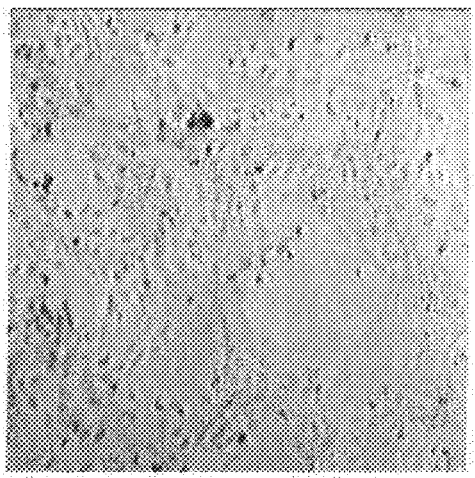
Figure 3:
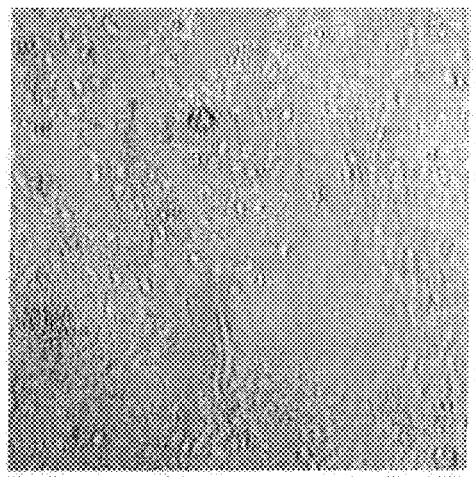

FIG. 3 shows part of an optical system for use with various embodiments of the present invention. The partial optical system shows an upper objective lens 110 for focussing light on to a camera forming part of a detector system 112 and a lenticular cell 150 of diameter $D_{cell}$ in various positions along the z-axis of the central optical axis of an imaging system 100.

To the left-hand side of FIG. 3, the cell 150 is displaced from a focal plane F of the objective lens 110 by a distance $p_{cell}$ along the z-axis in a direction away from the objective lens 110. This produces a dark image (shown on the lower left of FIG. 3) at the camera.

To the right-hand side of FIG. 3, the cell 150 is displaced from a focal plane F of the objective lens 110 by a distance $p_{cell}$ along the z-axis in a direction towards the objective lens 110. This produces a bright field image (shown on the lower right of FIG. 3) at the camera.

In analysing the optics of FIG. 3, it is known that in the conditions when the characteristic scale of non-uniformity L in the sample is comparable with the wavelength λ of incident EM radiation (i.e. at λ≈L), the character of the resulting (interacted) field is determined by diffraction, whereas, at λ<<L, it is dominated by refraction and therefore an interacted field might be considered in the geometric optics limit [9].

On the other hand, biological cells can represent themselves as micron-sized sacks filled by cytosole and other biological material, and therefore, from the viewpoint of geometric optics, the majority of cells have a shape resembling a convex lens.

Accordingly, the various following numbered considerations and approximations may be used for analysis:
1. Cells in the sample might be distributed along a z-axis (e.g. in a thick sample), so they do not all appear simultaneously in focus. Therefore, multiple z-planes may be imaged to gather complementary information from throughout the depth of the sample.
2. Bright field Kohler illumination mode is used. Numerical apertures of the objective and condenser are thus $NA_O$ and $NA_C$, respectively, and the objective lens aperture angle $\alpha = \arcsin(NA_O)$.
3. The cell can be represented by a positive (convex) micron-sized thin lens with the diameter $D_{cell}$ and equal curvature radii $R_{c,cell}$ (where $R_{c,cell} \geq D_{cell}/2$), made of a material with an average refractive index $n_c$ slightly differing from that of the surrounding medium $n_m$. That difference might be of the order $|\Delta n|=|n_c-n_m|\approx 0.02$. The medium in which cells are immersed is implied to be uniform and transparent, and $n_c > n_m$.
4. Being placed exactly in the focal plane of the objective, such a cell will scatter some incident light and therefore will appear slightly darker on a bright background. Cell scattering occurs due to the diffraction on internal non-uniformities (side directional lobes of scattering), and may constitute several percent of the incident light intensity.
5. Being placed just before the focal plane in the object space at a distance corresponding to the blockage of the aperture of the objective (as per the left-hand side of FIG. 3), a cell will appear out of focus but also dark on a bright background, mostly due to the lensing effect, causing the reduction of an effective light gathering aperture.
6. Analogously, being placed just after the focal plane closer to the objective at a distance corresponding to the blockage of its aperture (as per the right-hand side of FIG. 3), a cell will appear out of focus but brighter on a dark background, due to an increase of the light gathering aperture. However, that can only happen at $NA_C > NA_O$, because in this case, the mentioned gain in light intensity is limited by the rays converging at the angles $\alpha_{Cell, bright}$ exceeding α.
7. The contrast provided by the cell lensing effect might be estimated through the ratio of the aperture angles $\alpha_{Cell}$ and α shown in FIG. 3. This ratio is attributed to the "Cell" versus "No Cell" intensity ratio:

$$\frac{I_{Cell}}{I_{NoCell}} \approx \frac{\alpha_{Cell}}{\alpha} \approx \frac{\arctg\left[tg(\alpha) \pm \frac{\Delta n}{n_m} \cdot \frac{D_{Cell}}{R_{c,Cell}}\right]}{\alpha} \quad \text{Equation (5)}$$

Figure 4:
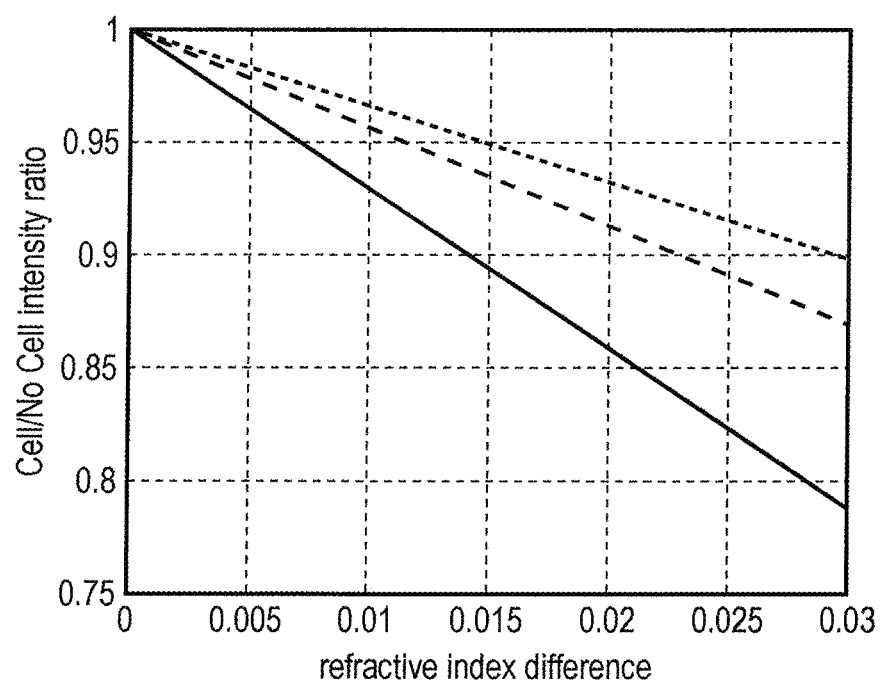
FIG. 4 shows dark contrast provided by cell lensing.

Equation (5) follows immediately from the lens formula and lens maker equations. Signs (+) and (−) correspond to the "bright" and "dark" field cases. It can be shown that at small |Δn|, a Taylor expansion of arc tangent in (4) in the vicinity of tg(α) gives:

$$\frac{I_{Cell}}{I_{NoCell}} \approx \frac{\alpha_{Cell}}{\alpha} \quad \text{Equation (6)}$$

$$\approx 1 + \frac{1}{\alpha} \cdot \frac{\Delta n}{n_m} \cdot \frac{D_{Cell}}{R_{c,Cell}} \cdot (1 - NA_O^2)$$

$$= 1 + \frac{1}{\arcsin(NA_O)} \cdot \frac{\Delta n}{n_m} \cdot \frac{D_{Cell}}{R_{c,Cell}} \cdot (1 - NA_O^2)$$

where the modulus of the second term is a decreasing function of $NA_O$. In other words, the contrast caused by lensing is bigger at lower aperture settings. This property is illustrated by the plots shown in FIG. 4.

Taking into account the above considerations, it is thus possible to devise the following simple strategy for contrast improvement:
a) Set up a microscope with $NA_C \leq NA_O$;
b) For a thin sample, acquire two images, one in focus and another at a distance $p_{cell}=D_{cell}/2tg(\alpha)$ in the object space respect to the plane of a best focus;
c) For a thick sample, acquire images from multiple z-planes in relevant range with spacing interval Δz about $\Delta z=p_{cell}/2=D_{cell}/4tg(\alpha)$; and
d) Look for the dark signatures of cells in the acquired z-plane images, for example by using the techniques referred to herein.

Another possibility is to use the "brightening" phenomenon at $NA_C > NA_O$. However, this effect is supposed to be somewhat less pronounced (not accumulated with the contrast surplus that is due to scattering). Usage of a "brightening" technique is analogous to the dark signature technique described above except at the following points: a) setting up of a microscope with $NA_C > NA_O$; and d) looking for bright cell signatures.

The herein described procedure results in the creation of an effective "projection" image that may be used to gather information from different depths inside a thick sample.

According to this aspect, the procedure is similar to known "best focus" ("extended focus") algorithms applied for fluorescence modality (and may, for example, use the same GUI) such as, for example, those defined using Equations 7 and 8 as follows:

Firstly, a pixel-wise transform FocusMeasure[J] may be defined as:

$$\text{FocusMeasure}[J]=\langle(J-\langle J\rangle_\epsilon)^2\rangle_\epsilon \quad \text{Equation (7)}$$

$$\text{or FocusMeasure}[J]=(\nabla_\epsilon J)^2 \quad \text{Equation (8)}$$

Then, for each of the N images $J_i$, i=1, . . . N, FocusMeasure $[J_i]$ is calculated.

Certain best focus algorithms, that may be used in various embodiments of the present invention, will now be briefly described below in connection with Equations 9 to 14, which are presented by way of non-limiting example only.

For an image combination weighting method, the result is the weighted sum of images with focus measure:

$$w_i = \frac{(FocusMeasure[J_i])^p}{\sum_{k=1}^{N} (FocusMeasure[J_k])^p}, \quad p \geq 1 \quad \text{Equation (9)}$$

$$result = \sum_{i=1}^{N} w_i J_i \quad \text{Equation (10)}$$

Alternatively, for image combination using a direct value method, for each pixel (x, y) in the images, the image in $J_{k(x,y)}$ closest to the focus is found, and the pixel value $J_{k(x,y)}(x,y)$ chosen as a result:

$$k(x,y) = \arg\max_i \{FocusMeasure[J_i](x,y)\} \quad \text{Equation (11)}$$

$$result(x,y) = J_{k(x,y)}(x,y) \quad \text{Equation (12)}$$

where, in both cases the image J is averaged with the $\epsilon$-sized square mask $1Box(\epsilon)$ $$\langle J \rangle_\epsilon = J \otimes 1Box(\epsilon) \quad \text{Equation (13)}$$

and the square of the modulus of the Gaussian derivative ($\sigma$-sized) is:

$$(\nabla_\sigma J)^2 \equiv \left[\frac{\partial}{\partial x} J \otimes_x G(0,\sigma)\right]^2 + \left[\frac{\partial}{\partial y} J \otimes_y G(0,\sigma)\right]^2 \quad \text{Equation (14)}$$

Figure 5:
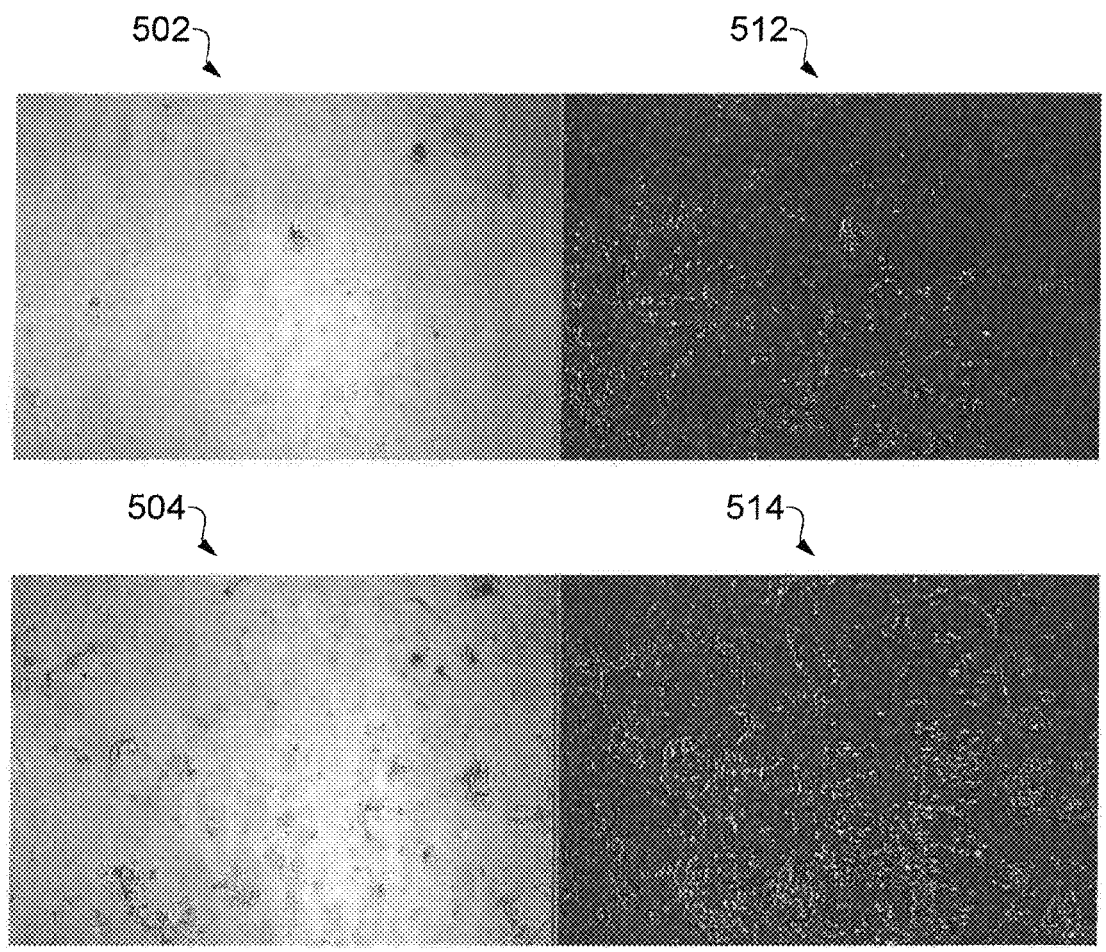
FIG. 5 shows original and processed images obtained in accordance with a method according to the present invention.

FIG. 5 shows original 502, 504 and processed images 512, 514 obtained in accordance with a method according to the present invention. Uppermost original image 502 is derived from a sample containing non-stimulated angiogenic cells. The lower original image 504 is for a sample containing angiogenic cells stimulated by vascular endothelial growth factor (VEGF) and tissue necrosis factor $\alpha$ (TNF$\alpha$).

For this experiment, the numerical aperture of the objective was $NA_O$=0.1 (Nikon 4×, with depth of focus about 50 μm), $\Delta z$ was kept at $\Delta z$=50 μm. Four bright field images $U(Z_k)$ were acquired in the vicinity of the best focus at $Z_k = Z_0 + k \cdot \Delta Z$, where k=1, 2, 3, 4. Resolution of the images was 2 μm/pixel with a field of view 2.78×2.08 mm.

To combine the images $U(Z_k)$ to obtain the respective enhanced processed images $U_r$ 512, 514 shown in FIG. 5, first a simple pixel-by-pixel minimum operation was applied to $U(Z_k)$, then a nonlinear $\epsilon$-sized top-hat transform was applied to the inverted minimum image, and then signal was thresholded at $U=U_T$, thus:

i) $U_1 = \min_k \{U(Z_k)\}$;

ii) $U_2 = NTH(inv[U_1]; \epsilon | .)$; and iii) $U_r = U_T + \frac{(U_2 - U_T) + |U_2 - U_T|}{2}$ where inv[ . . . ] is the image inversion operation A nonlinear top-hat transform is parameterised by a characteristic size $\epsilon$, which is close to a typical cell size. The nonlinear top-hat transform was applied in this case for shading elimination since expression i), relating to intensity ratio, only provides a localised estimate.

Enhanced grey scale processed images 512, 514 are thus produced by the application of this method according to various aspects of the present invention which was designed to detect dark features present in the images due to the cell lensing effect at $NA_C < NA_O$.

However, various aspects and embodiments of the present invention may also make use of brightening phenomena at $NA_C > NA_O$. For example, an analysis of both bright and dark features may be combined as follows:

i) $U_1^{dark} = \min_k \{U(Z_k)\}; U_1^{bright} = \max_k \{U(Z_k)\}$;

ii) $U_2^{dark} = NTH(inv[U_1^{dark}]; \epsilon | .); U_2^{bright} = NTH(U_1^{bright}; \epsilon | .)$;

iii) $U_r = \begin{cases} 1, & U_2^{dark} > U_T, U_2^{bright} > U_T \\ 0, & \text{otherwise.} \end{cases}$ When applying such a technique, one preferably needs to ensure that the same cells are well represented in Z-planes by the dark signatures when sampled at $NA_C < NA_O$, as well as by bright signatures when sampled at $NA_C > NA_O$.

Figure 6:
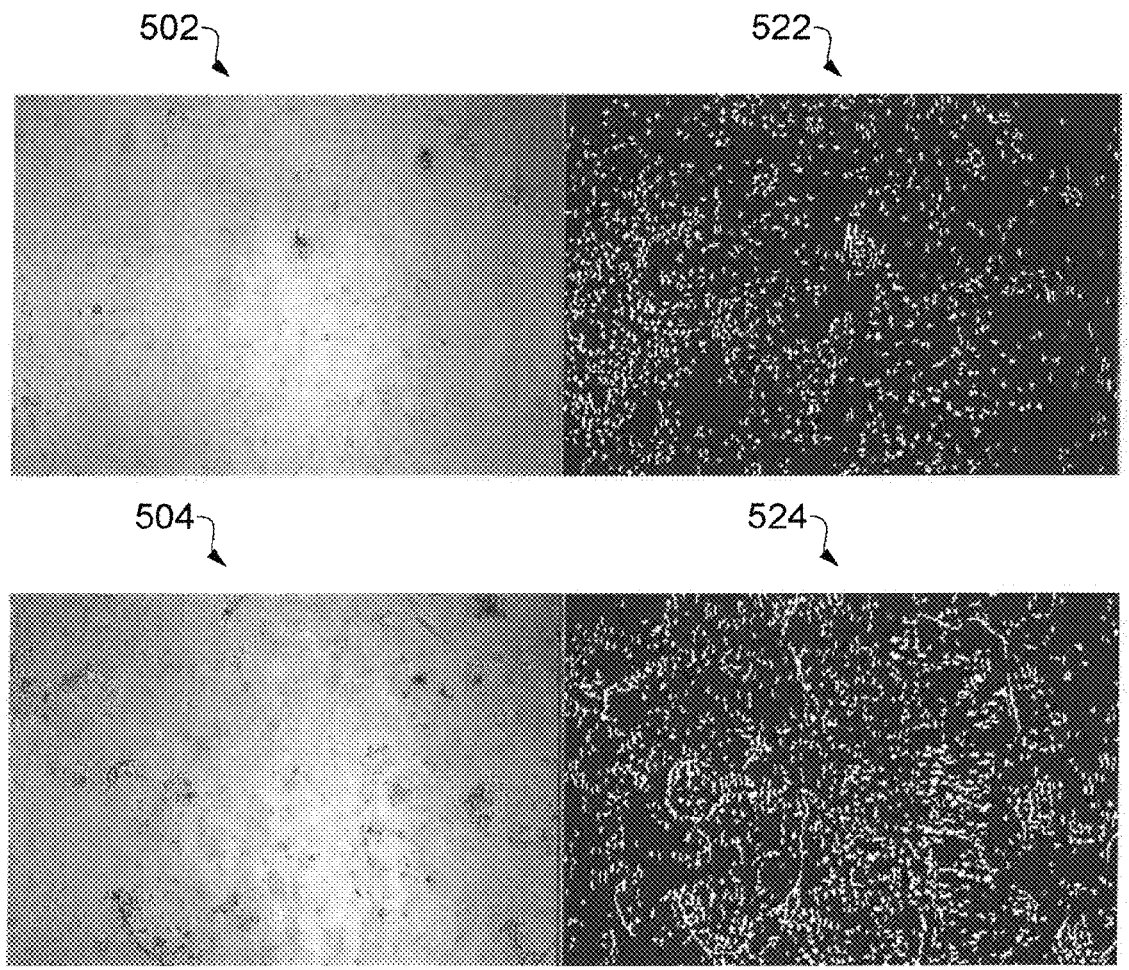
FIG. 6 shows the images of FIG. 5 with a threshold filter applied to the processed images obtained in accordance with the method according to the present invention.

FIG. 6 shows the original images 502, 504 of FIG. 5 with a threshold filter applied to the processed images 512, 514 thereof giving rise to thresholded processed images 522, 524. The images 512, 514 have been thresholded with U=1.06, size sieved and then black/white-closed using a two pixel sized mask. The characteristic size for the top-hat for this processing was $\epsilon$=9.

Thresholded processed images 522, 524 are thus binary (i.e. black and white) images $U_r$ provided in accordance with:

$$U_r = \begin{cases} 1, & U_2 > U_T \\ 0, & \text{otherwise} \end{cases}$$

In both FIGS. 5 and 6, it is clear that various image features have been enhanced by application of various techniques in accordance with certain aspects and embodiments of the present invention.

Whilst various techniques have been discussed in connection with the present invention, those skilled in the art will realise that various functions can be implemented using computer program products. For example, a computer program product may be provided that is operable to configure an imaging system to implement one or more method steps of various algorithms according to embodiments of the present invention.

Various embodiments may also include one or more of software, hardware and/or firmware components. For example, conventional imaging systems might be upgraded by using software components transmitted to those systems, for example, via the Internet in order to enhance their functionality in accordance with the present invention.

In various embodiments of the present invention, processing of a plurality of images comprises identifying intensity changes between respective of the plurality of images caused by defocusing of light by cells in the sample and looking for dark intensity or light field intensity changes. One advantage of such embodiments is that it enables rapid size-tuned detection of cells to be performed, either automatically or otherwise. For example, a yes/no answer can be rapidly obtained to indicate the presence or absence of certain cells whose properties are known in advance.

Certain aspects and embodiments of the present invention may use unstained cells that have a low refractive index mismatch with their surroundings. High-throughput screening (e.g. for drug screening) can also be performed using thick and/or thin samples.

Various aspects and embodiments of the present invention may also be used as part of an automated microscope, e.g. in a GE IN Cell Analyzer 1000 that is commercially available from GE Healthcare Life Sciences, Little Chalfont, Buckinghamshire, U. K. Such an automated microscope is easy to use and can be used by non-expert users, for example, to analyse multiple cell samples. Additions of various aspects and embodiments of the present invention to such an automated microscope can thus not only make these even easier to use but also provide enhanced resultant images in the process.

Whilst the present invention has been described in accordance with various aspects and preferred embodiments, it is to be understood that the scope of the invention is not considered to be limited solely thereto and that it is the Applicant's intention that all variants and equivalents thereof also fall within the scope of the appended claims.

What is claimed is:

1. An imaging system (100) for enhancing microscopic images of unstained cells, the imaging system (100) comprising:
   a light source (102) for producing light (120a);
   a sample holder (109) for containing cells to be imaged;
   a condenser (104) for focussing the light (120b) at a focal plane within the sample holder (109) on the cells to be imaged;
   a translation mechanism for moving the focal plane of the light (120b) relative to the sample holder (109); and
   a detector system (112) configured to acquire a plurality of images at respective focal planes within the sample holder (109) and to process the plurality of images to provide an resultant enhanced image ($U_r$), wherein processing of the plurality of images comprises:
   applying a pixel-by-pixel minimisation operation to each of the plurality of images to identify a dark image ($U_1^{dark}$);
   applying a non-linear top-hat transform to the dark image ($U_1^{dark}$) to obtain an intermediate image ($U_2^{dark}$); and
   processing the intermediate image ($U_2^{dark}$) to produce the resultant enhanced image ($U_r$).

2. The imaging system (100) of claim 1, wherein the detector system (112) is further configured to identify a best focus within the sample holder (109) and to acquire the plurality of images at respective focal planes within the sample holder (109) near to the best focus.

3. The imaging system (100) of claim 1, further comprising an aperture stop (106) provided between the light source (102) and the detector system (112).

4. The imaging system (100) of claim 3, wherein the size of the aperture stop (106) is variable.

5. The imaging system (100) of claim 1, wherein:
the dark image is defined by:

$$U_1^{dark} = \min_k\{U(Z_k)\},$$

where $U(Z_k)$ is the $k^{th}$ image in the Z-plane;
the intermediate image is defined by:

$$U_2^{dark} = NTH(inv[U_1^{dark}]; \epsilon|.),$$

where NTH is a non-linear $\epsilon$-pixel top-hat operation applied to the dark image, inv[ . . . ] is image inversion operation; and
the resultant enhanced image is obtained by applying the following transform:

$$U_r = U_T + \frac{(U_2^{dark} - U_T) + |U_2^{dark} - U_T|}{2},$$

where $U_T$ defines a predetermined threshold image.

6. The imaging system (100) of claim 1, wherein processing of the plurality of images further comprises applying thresholding to the resultant enhanced image ($U_r$).

7. An imaging system (100) for enhancing microscopic images of unstained cells, the imaging system (100) comprising:
   a light source (102) for producing light (120a);
   a sample holder (109) for containing cells to be imaged;
   a condenser (104) for focussing the light (120b) at a focal plane within the sample holder (109) on the cells to be imaged;
   a translation mechanism for moving the focal plane of the light (120b) relative to the sample holder (109); and
   a detector system (112) configured to acquire a plurality of images at respective focal planes within the sample holder (109) and to process the plurality of images to provide an resultant enhanced image ($U_r$), wherein processing of the plurality of images comprises:
   applying a pixel-by-pixel maximisation operation to each of the plurality of images to identify a bright image ($U_1^{bright}$);
   applying a non-linear top-hat transform to the bright image ($U_1^{bright}$) to obtain an intermediate image ($U_2^{bright}$); and
   processing the intermediate image ($U_2^{bright}$) to produce the resultant enhanced image ($U_r$).

8. The imaging system (100) of claim 7, wherein:
the bright image is defined by:

$$U_1^{bright} = \max_k\{U(Z_k)\},$$

where $U(Z_k)$ is the $k^{th}$ image in the Z-plane;
the intermediate image is defined by:

$$U_2^{bright} = NTH(U_1^{bright}; \epsilon|.),$$

where NTH is a non-linear $\epsilon$-pixel top-hat operation applied to the bright image; and
the resultant enhanced image is obtained by applying the following transform:

$$U_r = U_T + \frac{(U_2^{bright} - U_T) + |U_2^{bright} - U_T|}{2},$$

where $U_T$ defines a predetermined threshold image.

9. The imaging system (100) of claim 7, wherein processing of the plurality of images further comprises applying thresholding to the enhanced processed image ($U_r$).

10. The imaging system (100) of claim 7, wherein the detector system (112) is further configured to identify a best focus within the sample holder (109) and to acquire the plurality of images at respective focal planes within the sample holder (109) near to the best focus.

11. The imaging system (100) of claim 7, further comprising an aperture stop (106) provided between the light source (102) and the detector system (112).

12. The imaging system (100) of claim 11, wherein the size of the aperture stop (106) is variable.

13. A method (200) for enhancing microscopic images of unstained cells, the method (200) comprising:
   acquiring (202) a plurality of images at respective focal planes within a sample holder (109); and processing (210) the plurality of images to provide an resultant enhanced image ($U_r$), wherein the step (210) of processing of the plurality of images comprises:

applying a pixel-by-pixel minimisation operation to each of the plurality of images to identify a dark image ($U_1^{dark}$);

applying a non-linear top-hat transform to the dark image ($U_1^{dark}$) to obtain an intermediate image ($U_2^{dark}$); and processing the intermediate image ($U_2^{dark}$) to produce the resultant enhanced image ($U_r$).

14. The method (200) of claim 13, further comprising the step of setting an aperture stop prior to acquiring the plurality of images.

15. The method (200) of claim 13, wherein:
the dark image is defined by:

$$U_1 = \min_k\{U(Z_k)\},$$

where $U(Z_k)$ is the $k^{th}$ image in the Z-plane;
the intermediate image is defined by:

$$U_2^{dark} = NTH(inv[U_1^{dark}]; \epsilon|.),$$

where NTH is a non-linear $\epsilon$-pixel top-hat operation applied to the dark image; inv[ . . . ] is image inversion operation and the resultant enhanced image is obtained by applying the following transform:

$$U_r = U_T + \frac{(U_2^{dark} - U_T) + |U_2^{dark} - U_T|}{2},$$

where $U_T$ defines a predetermined threshold image.

16. The method (200) of claim 13, wherein the step (210) of processing the plurality of images further comprises applying thresholding to the enhanced processed image ($U_r$).

17. A method (200) for enhancing microscopic images of unstained cells, the method (200) comprising:

acquiring (202) a plurality of images at respective focal planes within a sample holder (109); and processing (210) the plurality of images to provide an resultant enhanced image ($U_r$), wherein the step (210) of processing the plurality of images comprises:

applying a pixel-by-pixel maximisation operation to each of the plurality of images to identify a bright image ($U_1^{bright}$);

applying a non-linear top-hat transform to the bright image ($U_1^{bright}$) to obtain an intermediate image ($U_2^{bright}$); and processing the intermediate image ($U_2^{bright}$) to produce the resultant enhanced image ($U_r$).

18. The method (200) of claim 17, wherein:
the bright image is defined by:

$$U_1^{bright} = \max_k\{U(Z_k)\},$$

where $U(Z_k)$ is the $k^{th}$ image in the Z-plane;
the intermediate image is defined by:

$$U_2^{bright} = NTH(U_1^{bright}; \epsilon|.),$$

where NTH is a non-linear $\epsilon$-pixel top-hat operation applied to the bright image; and the resultant enhanced image is obtained by applying the following transform:

$$U_r = U_T + \frac{(U_2^{bright} - U_T) + |U_2^{bright} - U_T|}{2},$$

where $U_T$ defines a predetermined threshold image.

19. The method (200) of claim 17, further comprising the step of setting an aperture stop prior to acquiring the plurality of images.

20. The method (200) of claim 17, wherein the step (210) of processing the plurality of images further comprises applying thresholding to the enhanced processed image ($U_r$).

* * * * *